US008772689B2

(12) United States Patent
Yeh et al.

(10) Patent No.: US 8,772,689 B2
(45) Date of Patent: Jul. 8, 2014

(54) OMNIDIRECTIONAL SUN POSITION SENSING DEVICE WITH A PLURALITY OF OPTICAL SENSORS

(75) Inventors: Hong-Yih Yeh, Taoyuan County (TW); Yen-Wei Huang, New Taipei (TW); Cheng-Dar Lee, Tainan (TW)

(73) Assignee: Institute of Nuclear Energy Research, Atomic Energy Council, Taoyuan County (TW)

( * ) Notice: Subject to any disclaimer, the term of this patent is extended or adjusted under 35 U.S.C. 154(b) by 277 days.

(21) Appl. No.: 13/454,208

(22) Filed: Apr. 24, 2012

(65) Prior Publication Data
US 2012/0305747 A1    Dec. 6, 2012

(30) Foreign Application Priority Data

Jun. 2, 2011   (TW) .............................. 100119346 A (51) Int. Cl.
| | | |
|---|---|---|
| *G01C 21/02* | (2006.01) | |
| *G01C 21/24* | (2006.01) | |
| *G01J 1/20* | (2006.01) | |
| *F24J 2/40* | (2006.01) | |
| *F24J 2/38* | (2014.01) | |
| *G01J 1/06* | (2006.01) | |
| *G01S 3/786* | (2006.01) | |
| *G01J 1/16* | (2006.01) | |
| *G01J 1/42* | (2006.01) | |
| *G01J 1/02* | (2006.01) | |
| *G01J 1/04* | (2006.01) | |
| *G01J 1/44* | (2006.01) | |

(52) U.S. Cl.
CPC .... *G01J 1/20* (2013.01); *F24J 2/40* (2013.01); *F24J 2/38* (2013.01); *G01J 1/06* (2013.01); *G01S 3/7861* (2013.01); *G01J 1/1626* (2013.01); *G01J 1/4257* (2013.01); *G01J 1/0271* (2013.01); *G01J 1/0403* (2013.01); *G01J 2001/4266* (2013.01); *G01J 1/44* (2013.01)
USPC ....................... 250/203.4; 126/573

(58) Field of Classification Search
CPC ................... F24J 2/00; F24J 2/38; F24J 2/40; F24J 2002/38; G01S 3/7861; G01S 3/786
USPC ...................... 250/203.3, 203.4; 126/569, 573
See application file for complete search history.

(56) References Cited

U.S. PATENT DOCUMENTS 4,225,781 A * 9/1980 Hammons .................. 250/203.4

\* cited by examiner

*Primary Examiner* — Francis M Legasse, Jr.
(74) *Attorney, Agent, or Firm* — Jackson IPG PLLC (57) ABSTRACT

A method is provided to track the sun. An omnidirectional sensor is used for acquiring sun's position. The sensor can track sun's position in an omnidirectional way. A controller is also provided to control the tracking. When the sun shines strongly, the sensor is controlled to track the sun's position. When the sun does not shine strongly, the tracking is stopped. Thus, the cost for tracking the sun's position is reduced and accuracy of the tracking is enhanced.

4 Claims, 6 Drawing Sheets

OMNIDIRECTIONAL SUN POSITION SENSING DEVICE WITH A PLURALITY OF OPTICAL SENSORS

TECHNICAL FIELD OF THE INVENTION

The present invention relates to sensing sun position; more particularly, relates to combining a plurality of optical sensors and a framework to form a sensing device for tracking the sun with high accuracy through equivalent flux values, where the sensing device is coordinated with a controller to be used in a solar tracker for omnidirectional detection.

DESCRIPTION OF THE RELATED ARTS

High concentration photovoltaic (HCPV) system has a higher power generation performance than traditional solar cell. But, the HCPV system has to be coordinated with a h-accuracy solar tracker for effectively generating power, since the precision of the solar tracker affects the power generation performance directly. Sun position sensor is a key unit in the solar tracker for tracking position of the sun. Hence, technologies for improving performance of the sun position sensor are developed.

Figure 6:
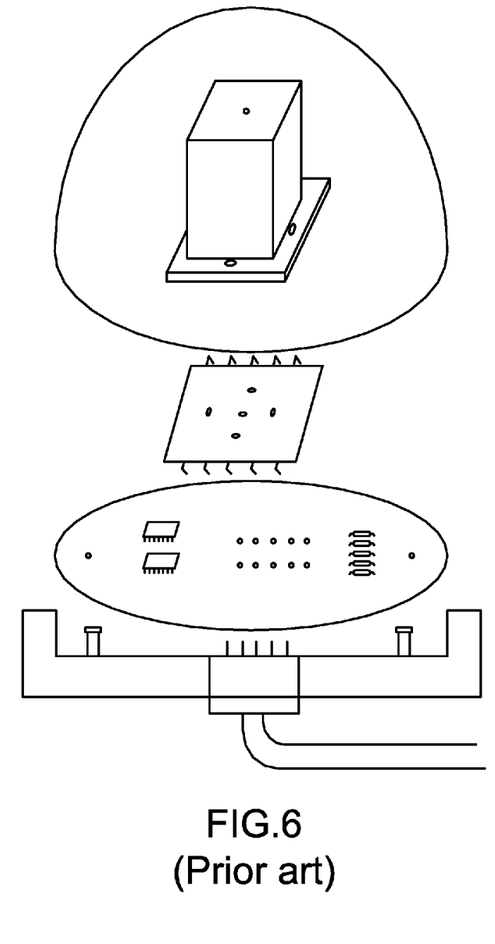
FIG. 6 is the view of the prior art.

A prior art is shown in FIG. 6. The prior art has a major disadvantage on visual angle limitation. If the sun is not located within a visual angle range of the sun position sensor (e.g. +/−45° to +/−75°), tracking fails and is ignored. Another problem is on when to track. Even when the sun is positioned within the visual angle range, a sensing value set as a base for tracking is hard to obtain for every optical sensor has its own different sensing value and the sensing value may have a very wide range. Not to mention that the sensing value will not be obtainable if the sun is not positioned within the visual angle range and thus cannot be tracked.

As a result, a solution is to use a decoder coordinated with calculation of solar orbit for a tracking controller to acquire position of the sun to be compared with a real-time position of the sun. The solar tracker tracks to turn toward the position of the sun for making the sun located within a visual angle range of the sun position sensor. Then, according to a sensing value obtained by the sun position sensor, a further tracking is done for the solar tracker to focus on the sun if the sensing value obtained is big enough. However, in this case, a decoder, a global positioning system (GPS), a microprocessor capable of floating-point calculation and a complex equation for solar orbit are further required, which adds cost to the whole control system and uses complex components while risk in failure is increased.

Hence, the prior arts do not fulfill all users' requests on actual use.

SUMMARY OF THE INVENTION

The main purpose of the present invention is to combine a plurality of optical sensors and a framework to form a sensing device for tracking the sun with high accuracy through equivalent flux values, where the sensing device is coordinated with a controller to be used in a solar tracker for omnidirectional detection.

The second purpose of the present invention is to judge sunlight strength and sun position for tracking in an omnidirectional way.

The third purpose of the present invention is to provide a tracking method which uses flux value and position of the sun for tracking with low cost and high accuracy.

To achieve the above purposes, the present invention is an omnidirectional sun position sensing method, the method uses an omnidirectional sensing device to sense sunlight luminance for tracking the sun; the sensing device is coordinated with a controller; the controller is connected with a solar tracker; and the method comprises steps of: (a) according to a difference between sunlight luminance at the east direction and the west direction, tracking at the east and the west directions to make the sensing device focus on the sun; and (b) according to a difference between sunlight luminance at the south direction and the north direction, tracking at south direction and the north direction to make the sensing device focus on the sun. Accordingly, a novel omnidirectional sun position sensing method is obtained.

BRIEF DESCRIPTIONS OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1 to FIG. 5, which are a view showing a preferred embodiment according to the present invention; sectional views showing optical sensors in a hole not filled with glue and in a hole filled with glue; a structural view showing a controller; and a view showing a current-to-voltage converting circuit. As shown in the figures, the present invention is an omnidirectional sun position sensing method, where the method uses an omnidirectional sensing device to sense sunlight luminance for tracking the sun while the sensing device is coordinated with a controller and the controller is connected with a solar tracker. The omnidirectional sensing device comprises a framework 1 and a plurality of optical sensors 2.

Figure 1:
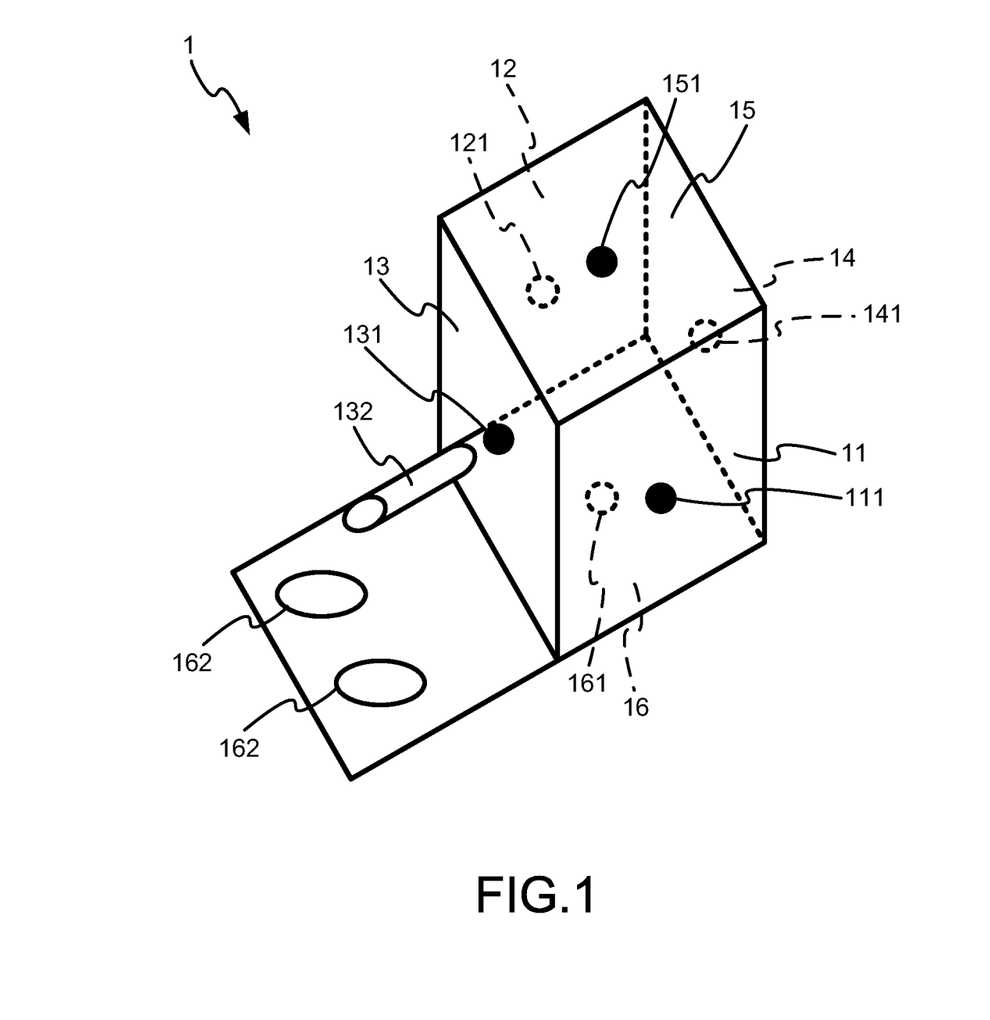
FIG. 1 is the view showing the preferred embodiment according to the present invention.

In FIG. 1, the framework 1 comprises five square plates 11~15 and a rectangle plate 16. Therein, the plates are aluminium alloy plates; the rectangle plate 16 has an area twice as big as the square plate 11~15; a cube is formed by combing the square plates 11~15 and the rectangle plate 16 at six directions of the cube; a hole 111,121,131,141,151,161 is set at each center position of the square plates 11~15 and a center position of a region of the rectangle plate 16 corresponding to the five square plates 11~15; two fixing holes 162 are set at a lower half region of the rectangle plate 16; and, the square plate 13 at the south direction has a through hole 132 at a lower left corner for guiding out wires.

Figure 2:
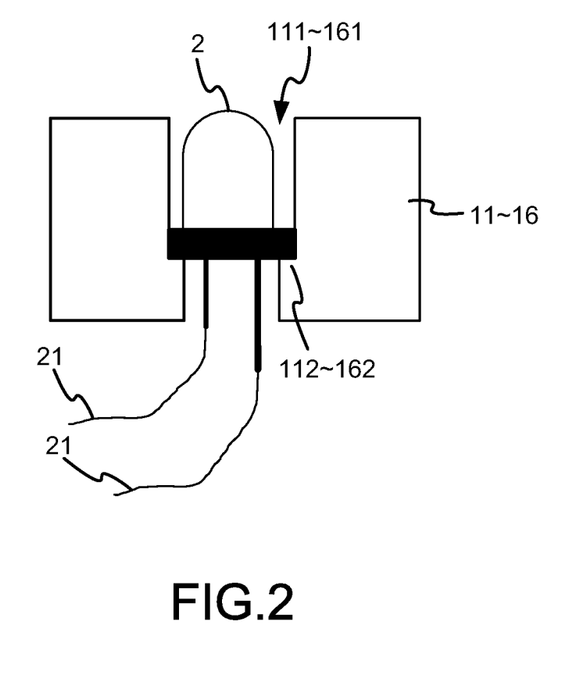
FIG. 2 is the sectional view showing the optical sensor in the hole not filled with the glue.
Figure 3:
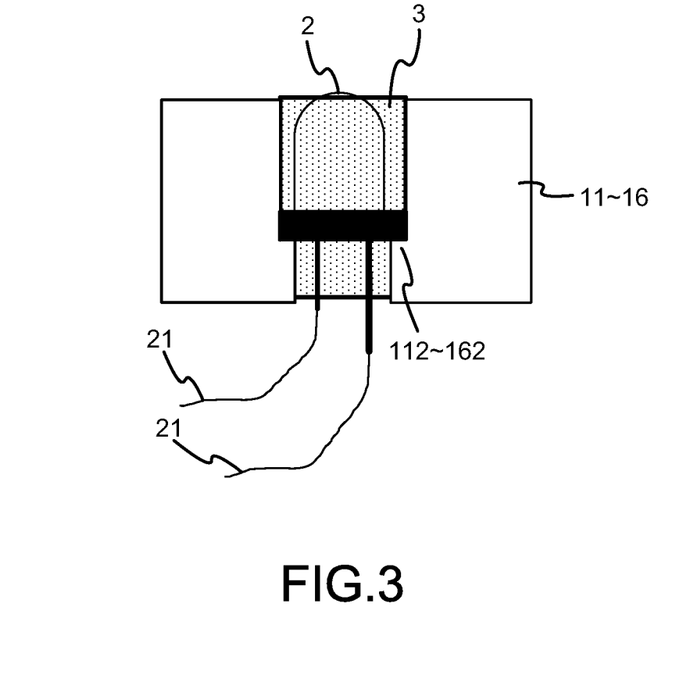
FIG. 3 is the sectional view showing the optical sensor in the hole filled with the glue.

In FIG. 2, each optical sensor 2 has two pins with each pin connected with a wire to form a set of wires 21; the set of wires 21 is separately penetrated through the hole 111~161 of each plate 11~16; and, each hole 111~161 has an indent 112~162 to separately lock the optical sensor 2. Thus, each optical sensor 2 is separately set on each plate 11~16 at the six directions; and, each set of wires 21 is guided to penetrate through the through hole 132 on the square plate 13 at the south direction to be connected with joint. In FIG. 3, the indent 112~162 installed with the optical sensor 2 on each plate 11~16 is filled with a water-proof sealing glue 3.

Figure 4:
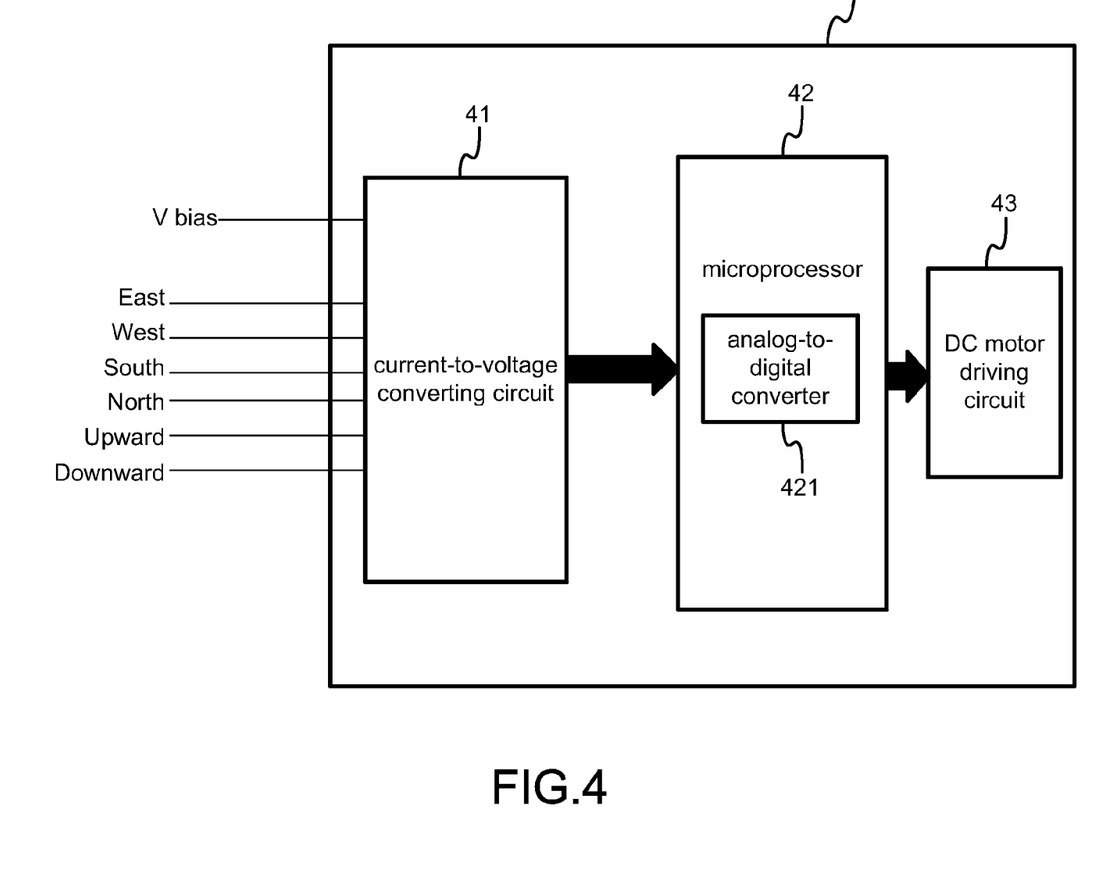
FIG. 4 is the structural view showing the controller.
Figure 5:
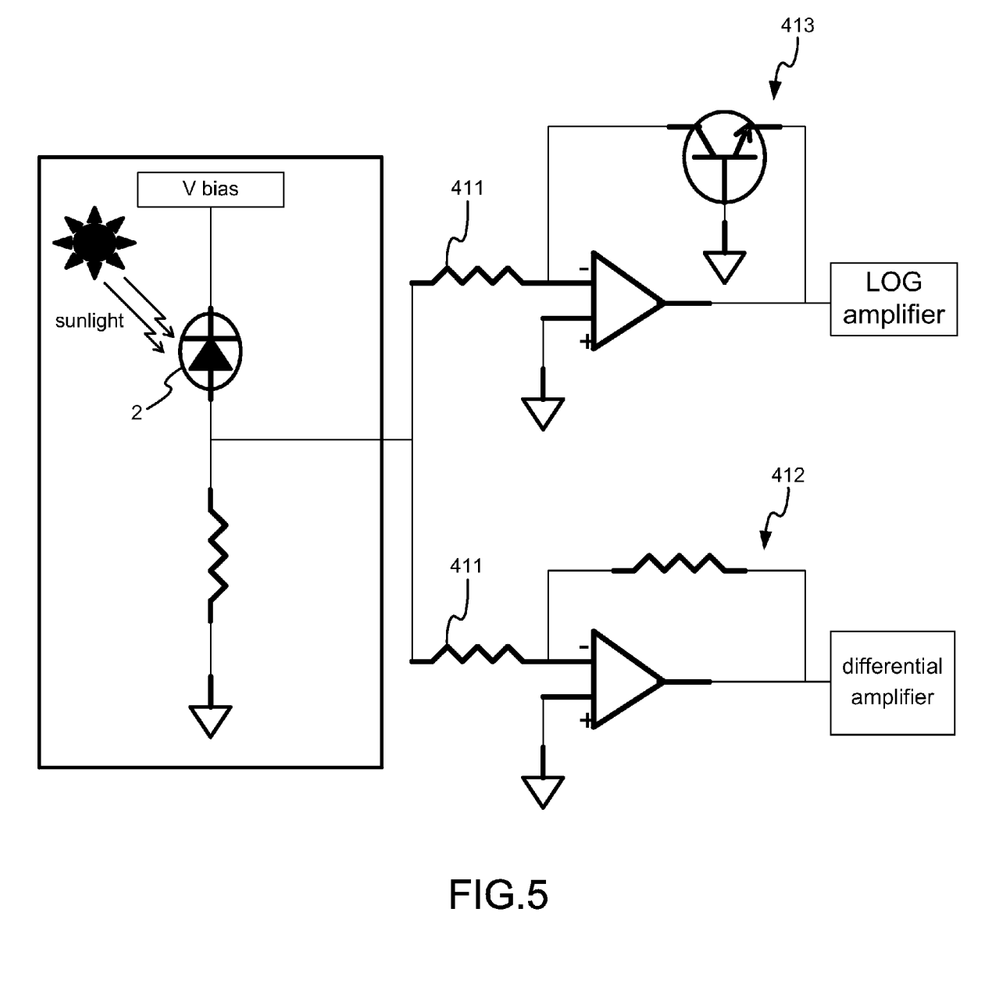
FIG. 5 is the view showing the current-to-voltage converting circuit.

The present invention has a low-power-consuming micro-process controller 4 connected with a control box of a solar tracker (as shown in FIG. 4) and the controller 4 comprises a current-to-voltage converting circuit 41, a microprocessor 42 and a direct-current (DC) motor driving circuit 43. Therein, the current-to-voltage converting circuit 41 (as shown in FIG. 5) comprises two load resistors 411, a differential amplifier 412 and a LOG amplifier 413. Two currents of the optical sensor 2 generated by being shone by the sun separately enter into the two load resistors 411. The load resistors 411 separately output voltages to the differential amplifier 412 and the LOG amplifier 413.

The differential amplifier 412 and the LOG amplifier 413 output signals to an analog-to-digital converter 421 of the microprocessor 42 for calculating a light flux value of each optical sensor 2 for tracking. Since optical strength of the sun in the optical sensor 2 has a range between 1 micro-ampere ($\mu A$) and 10 milli-ampere (mA) (having a range about 10 thousand times), the range of output value is reduced to about 5 times through the LOG amplifier 413. Thus, the analog-to-digital converter 421 will not be saturated. After an equivalent luminance value is obtained through parameter conversion, the equivalent luminance value is used to decide tracking actions of the solar tracker. On tracking the sun, the microprocessor 42 controls a driving motor module with the DC motor driving circuit 43 for turning the solar tracker toward the sun.

On using the present invention, an omnidirectional sun position sensing device is coordinated with a low-power-consuming micro-process controller to judge sun-light strength and sun position for tracking. In the beginning, tracking is started at the east and the west directions according to sensing values of optical sensors at the east and the west directions and then is continued at the south and the north directions according to sensing values of optical sensors at the south and the north directions. Thus, the sensing device is turned east or west to be focused on the sun and then is turned south or north to be focused on the sun. In this way, the sensing device is perfectly focused on the sun at the east, the west, the south and the north directions.

When the omnidirectional sun position sensing device is installed on a solar tracker, relationships among the sensing device, the sun position and the optical sensors comprises the following conditions:
  (a) When the sensing device is positioned horizontally and faces toward the east direction,
    (i) the optical sensor at the south direction obtains a biggest sensing value of sunlight luminance when the sun is located at the east direction;
    (ii) the optical sensor at the west direction or the upward direction obtains a biggest sensing value of sunlight luminance when the sun is located at the upward direction and shines toward the south direction; and
    (iii) the optical sensor at the north direction obtains a biggest sensing value of sunlight luminance when the sun is located at the west direction.
  (b) When the sensing device is positioned vertically and faces toward the east direction,
    (i) the optical sensor at the upward direction obtains a biggest sensing value of sunlight luminance when the sun is located at the east direction;
    (ii) the optical sensor at the west direction or the north direction obtains a biggest sensing value of sunlight luminance when the sun is located at the upward direction and shines toward the south direction; and
    (iii) the optical sensor at the downward direction obtains a biggest sensing value of sunlight luminance when the sun is located at the west direction.
  (c) When the sensing device is positioned horizontally and faces toward the south direction,
    (i) the optical sensor at the east direction obtains a biggest sensing value of sunlight luminance when the sun is located at the east direction;
    (ii) the optical sensor at the south direction or the upward direction obtains a biggest sensing value of sunlight luminance when the sun is located at the upward direction and shines toward the south direction; and
    (iii) the optical sensor at the west direction obtains a biggest sensing value of sunlight luminance when the sun is located at the west direction.
  (d) When the sensing device is positioned vertically and faces toward the south direction,
    (i) the optical sensor at the east direction obtains a biggest sensing value of sunlight luminance when the sun is located at the east direction;
    (ii) the optical sensor at the upward direction or the north direction obtains a biggest sensing value of sunlight luminance when the sun is located at the upward direction and shines toward the south direction; and
    (iii) the optical sensor at the west direction obtains a biggest sensing value of sunlight luminance when the sun is located at the west direction.
  (e) When the sensing device is positioned horizontally and faces toward the west direction,
    (i) the optical sensor at the north direction obtains a biggest sensing value of sunlight luminance when the sun is located at the east direction;
    (ii) the optical sensor at the east direction or the upward direction obtains a biggest sensing value of sunlight luminance when the sun is located at the upward direction and shines toward the south direction; and
    (iii) the optical sensor at the south direction obtains a biggest sensing value of sunlight luminance when the sun is located at the west direction.
  (f) When the sensing device is positioned vertically and faces toward the west direction,
    (i) the optical sensor at the downward direction obtains a biggest sensing value of sunlight luminance when the sun is located at the east direction;
    (ii) the optical sensor at the east direction or the north direction obtains a biggest sensing value of sunlight luminance when the sun is located at the upward direction and shines toward the south direction; and
    (iii) the optical sensor at the upward direction obtains a biggest sensing value of sunlight luminance when the sun is located at the west direction.

Accordingly, the present invention is an omnidirectional sun position sensing device, which uses a plurality of optical sensors and a framework to accurately track the sun with equivalent flux values. The sensing device is coordinated with a controller for processing a tracking method. The sensing device detects sunlight in an omnidirectional way by sensing optical strength of the sun at any direction. Tracking of the sun is done according to optical strength detected by the sensing device, where tracking is started when the optical strength is strong enough and is stopped when the optical strength is weak. At first, the sensing device obtains a position of the sun related to a solar tracker. Then, a microprocessor controls a driving motor module to turn the solar tracker toward the position of the sun for thus accurately tracking the sun. Hence, the tracking method of the present invention uses flux value and position of the sun for tracking the sun with low cost and high accuracy.

To sum up, the present invention is an omnidirectional sun position sensing device, where a plurality of optical sensors and a framework are combined to form a sensing device for tracking the sun with high accuracy through equivalent flux values while the sensing device is coordinated with a controller to be used in a solar tracker for omnidirectional detection.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An omnidirectional sun position sensing method,
wherein said method uses an omnidirectional sensing device to sense sunlight luminance and track the sun; said sensing device is coordinated with a controller; and said controller is connected with a solar tracker; and
wherein said method comprises steps of:
(a) according to a difference between sunlight luminance at a first direction and sunlight luminance at a second direction opposite to said first direction, tracking at said first direction and said second direction to make said sensing device focus on the sun; and
(b) according to a difference between sunlight luminance at a third direction perpendicular to said first direction and sunlight luminance at a fourth direction opposite to said third direction, tracking at said third direction and said fourth direction to make said sensing device focus on the sun,
wherein said omnidirectional sensing device comprises:
a framework, said framework having five square plates and a rectangle plate, said five square plates and said rectangle plate being combined to obtain a cube, said five square plates comprising a square plate at said first direction, a square plate at said second direction, a square plate at said third direction, a square plate at said fourth direction and a square plate at a fifth direction, said rectangle plate being located at a sixth direction, said fifth direction being perpendicular to said first direction and said third direction, said sixth direction being opposite to said fifth direction, said five square plates having the same size, said rectangle plate and said square plates at said first, said second, said third and said fifth directions being butted against said square plate at said fourth direction, said rectangle plate having a size twice as big as said square plate, a hole being obtained at a center position of each square plate and a center position of a region of said rectangle plate corresponding to said square plates, another region of said rectangle plate not corresponding to said square plates having at least two fixing holes, a through hole being obtained at a position adhering to said rectangle plate on said square plate at said third direction; and
a plurality of optical sensors, each optical sensor having two pins with each pin connected with a wire to obtain a set of wires, said sets of wires of said optical sensors separately penetrating through said holes of said square plates and said hole of said rectangle plate, said hole having an indent to hold said optical sensor, said optical sensors thus being placed on said square plates and said rectangle plate, said sets of wires being guided to penetrate through said through hole to be connected with joint,
wherein said indent of said hole holding said optical sensor is filled with a water-proof sealing glue.

2. The method according to claim 1,
wherein said square plates and said rectangle plate are aluminium alloy plates.

3. The method according to claim 1,
wherein said controller comprises a current-to-voltage converting circuit, a microprocessor and a direct-current (DC) motor driving circuit;
wherein said current-to-voltage converting circuit comprises two load resistors, a differential amplifier and a LOG amplifier; two currents of said optical sensor generated by being shone by the sun separately enter into said two load resistors; said load resistors separately output voltages to said differential amplifier and said LOG amplifier; and, then, said differential amplifier and said LOG amplifier output signals to an analog-to-digital (AD) converter of said microprocessor;
wherein said microprocessor calculates a light flux value of each optical sensor to obtain an equivalent luminance value through parameter conversion and said equivalent luminance value is used to decide tracking actions of said solar tracker; and
wherein said DC motor driving circuit is controlled and driven by said microprocessor to move said solar tracker toward position of the sun.

4. The method according to claim 1,
wherein relationships among said sensing device, said position of the sun and said optical sensors comprises the following conditions:
(a) when said sensing device is positioned horizontally and faces toward said first direction,
(i) said optical sensor at said third direction obtains a biggest sensing value of sunlight luminance when the sun is located at said first direction;
(ii) said optical sensor at a direction selected from a group consisting of said second direction and said fifth direction obtains a biggest sensing value of sunlight luminance when the sun is located at said fifth direction and shines toward said third direction; and
(iii) said optical sensor at said fourth direction obtains a biggest sensing value of sunlight luminance when the sun is located at said second direction;
(b) when said sensing device is positioned vertically and faces toward said first direction,
(i) said optical sensor at said fifth direction obtains a biggest sensing value of sunlight luminance when the sun is located at said first direction;
(ii) said optical sensor at a direction selected from a group consisting of said second direction and said fourth direction obtains a biggest sensing value of sunlight luminance when the sun is located at said fifth direction and shines toward said third direction; and
(iii) said optical sensor at said sixth direction obtains a biggest sensing value of sunlight luminance when the sun is located at said second direction;
(c) when said sensing device is positioned horizontally and faces toward said third direction,
(i) said optical sensor at said first direction obtains a biggest sensing value of sunlight luminance when the sun is located at said first direction;

(ii) said optical sensor at a direction selected from a group consisting of said third direction and said fifth direction obtains a biggest sensing value of sunlight luminance when the sun is located at said fifth direction and shines toward said third direction; and (iii) said optical sensor at said second direction obtains a biggest sensing value of sunlight luminance when the sun is located at said second direction;

(d) when said sensing device is positioned vertically and faces toward said third direction, (i) said optical sensor at said first direction obtains a biggest sensing value of sunlight luminance when the sun is located at said first direction;

(ii) said optical sensor at a direction selected from a group consisting of said fifth direction and said fourth direction obtains a biggest sensing value of sunlight luminance when the sun is located at said fifth direction and shines toward said third direction; and (iii) said optical sensor at said second direction obtains a biggest sensing value of sunlight luminance when the sun is located at said second direction;

(e) when said sensing device is positioned horizontally and faces toward said second direction, (i) said optical sensor at said fourth direction obtains a biggest sensing value of sunlight luminance when the sun is located at said first direction;

(ii) said optical sensor at a direction selected from a group consisting of said first direction and said fifth direction obtains a biggest sensing value of sunlight luminance when the sun is located at said fifth direction and shines toward said third direction; and (iii) said optical sensor at said third direction obtains a biggest sensing value of sunlight luminance when the sun is located at said second direction; and (f) when said sensing device is positioned vertically and faces toward said second direction, (i) said optical sensor at said sixth direction obtains a biggest sensing value of sunlight luminance when the sun is located at said first direction;

(ii) said optical sensor at a direction selected from a group consisting of said first direction and said fourth direction obtains a biggest sensing value of sunlight luminance when the sun is located at said fifth direction and shines toward said third direction; and (iii) said optical sensor at said fifth direction obtains a biggest sensing value of sunlight luminance when the sun is located at said second direction.

* * * * *